United States Patent

Garrett

[15] 3,697,141
[45] Oct. 10, 1972

[54] DRILL PIPE WEAR SLEEVE
[72] Inventor: William R. Garrett, Midland, Tex.
[73] Assignee: Smith Industries, International, Inc., Midland, Tex.
[22] Filed: May 21, 1970
[21] Appl. No.: 39,255

[52] U.S. Cl. .................................................308/4 A
[51] Int. Cl. ..............................................F16c 17/00
[58] Field of Search...............308/4 A; 175/323, 325; 287/52.04, 85; 285/236, DIG. 16

[56] References Cited

UNITED STATES PATENTS

| | | | |
|---|---|---|---|
| 3,411,837 | 11/1968 | Schellstede | 308/4 A |
| 2,663,599 | 12/1953 | Mackay | 308/4 A |
| 2,281,632 | 5/1942 | Steps | 308/4 A |
| 1,863,823 | 6/1932 | Barclay | 308/4 A |
| 166,735 | 8/1865 | Walworth | 285/DIG. 16 |
| 2,259,023 | 10/1941 | Clark | 285/286 |
| 2,943,009 | 6/1960 | Mirsky et al. | 308/4 A |
| 2,212,153 | 8/1940 | Eaton et al. | 287/85 |
| 1,938,822 | 12/1933 | Ferlin | 308/4 A |

Primary Examiner—Martin P. Schwadron
Assistant Examiner—Ronald H. Lazarus
Attorney—Murray Robinson, Ned L. Conley, Robert W. B. Dickerson and Bill B. Berryhill

[57] ABSTRACT

A metal drill pipe is provided with a metal wear sleeve and an elastomer insert between the wear sleeve and the pipe. The sleeve is mechanically interlocked to the insert, e.g., by a thread on the inside of the sleeve. The sleeve is made in sections welded together while clamped against the insert with sufficient force to press the thread into the insert. The insert is secured against axial motion on the pipe by cement. There is a mechanical interlock between the insert and the cement, e.g., serrations on the inner periphery of the insert, the cement being applied to the inner periphery of the insert before curing, or a thread formed on the outer periphery of the cement which is cured on the pipe before the insert is compressed thereagainst during application of the sleeve to the insert. The cement extends beyond the ends of the wear sleeve to protect the pipe against corrosion due to well fluid trapped around the pipe adjacent a sleeve end. The sleeve is provided with annular grooves therearound at each end; the grooves increase the flexibility of the sleeve and also serve as wear indicators.

23 Claims, 18 Drawing Figures

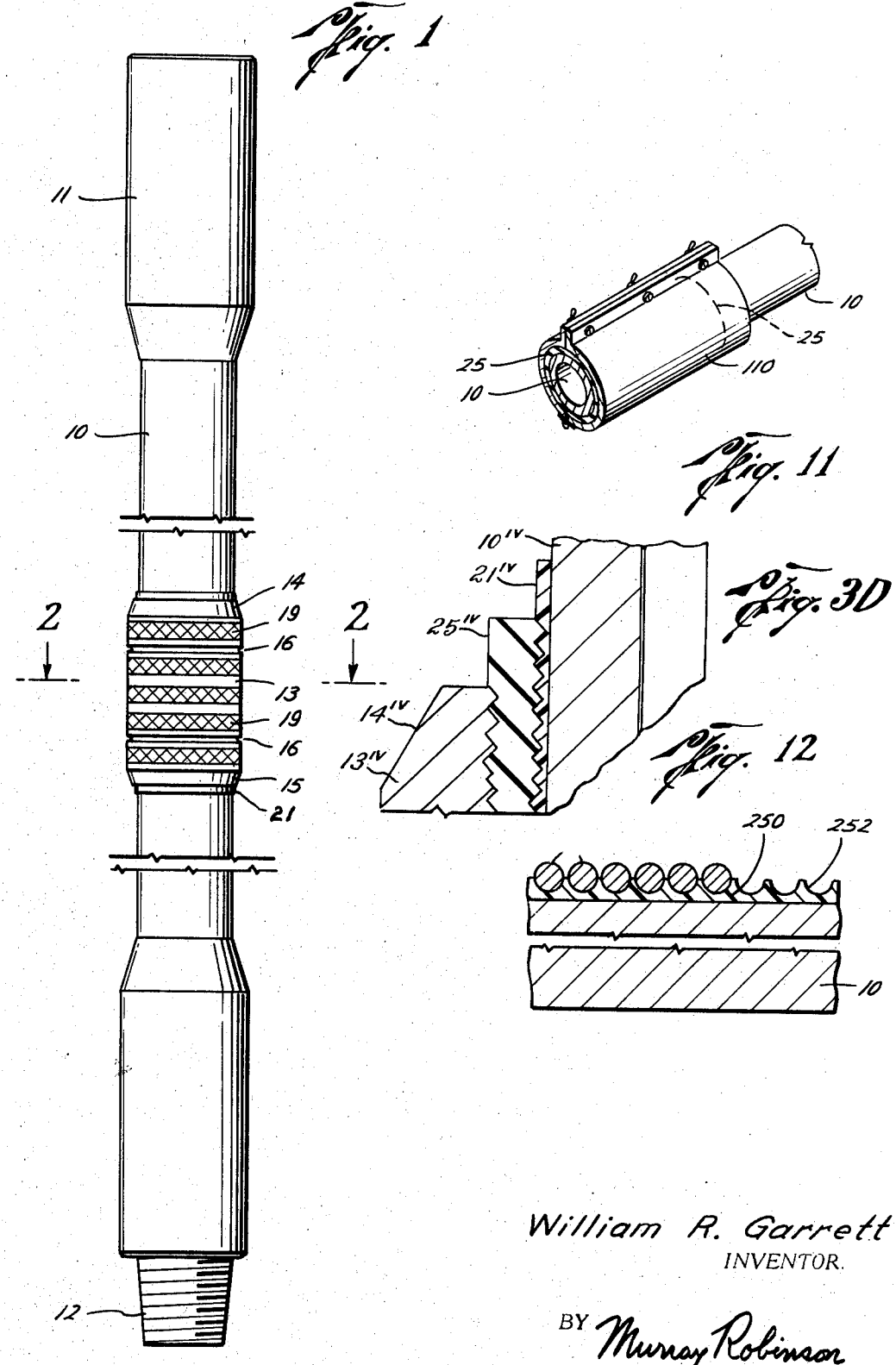

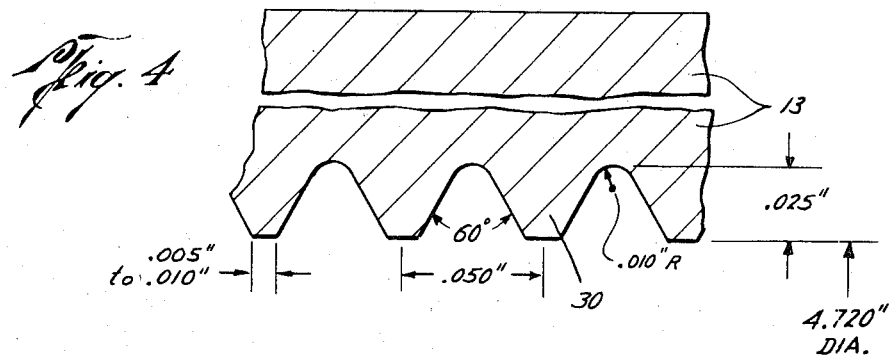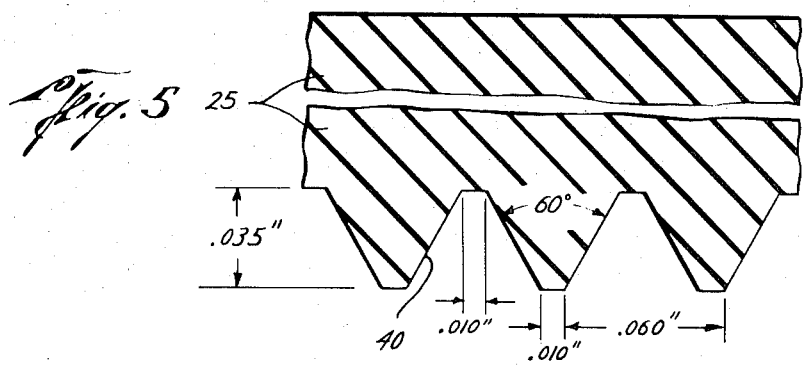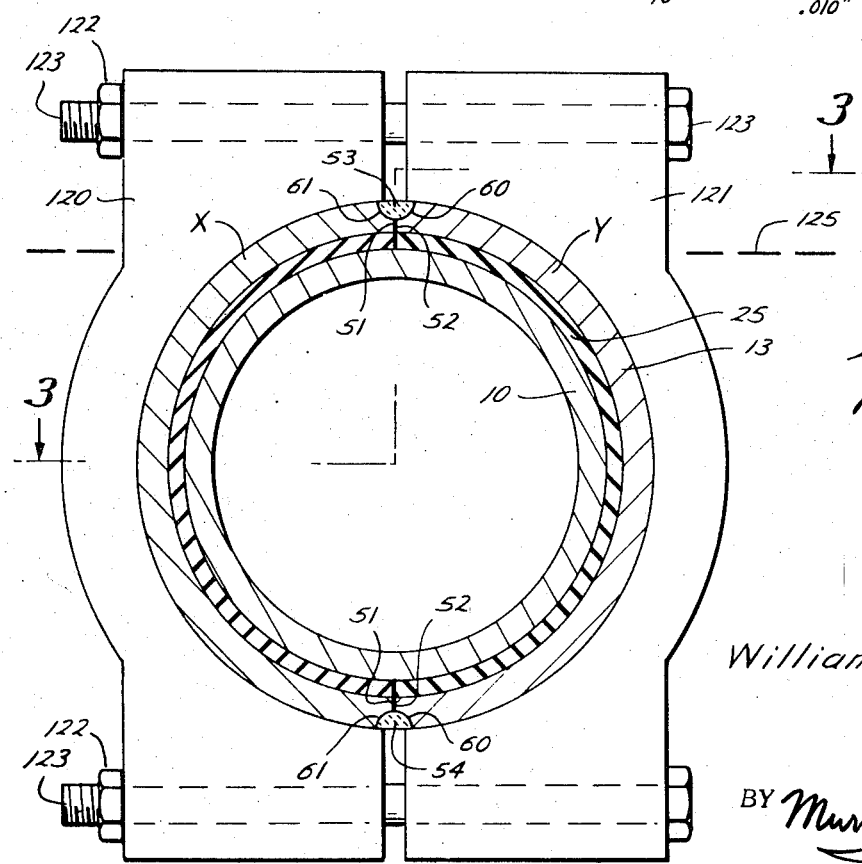

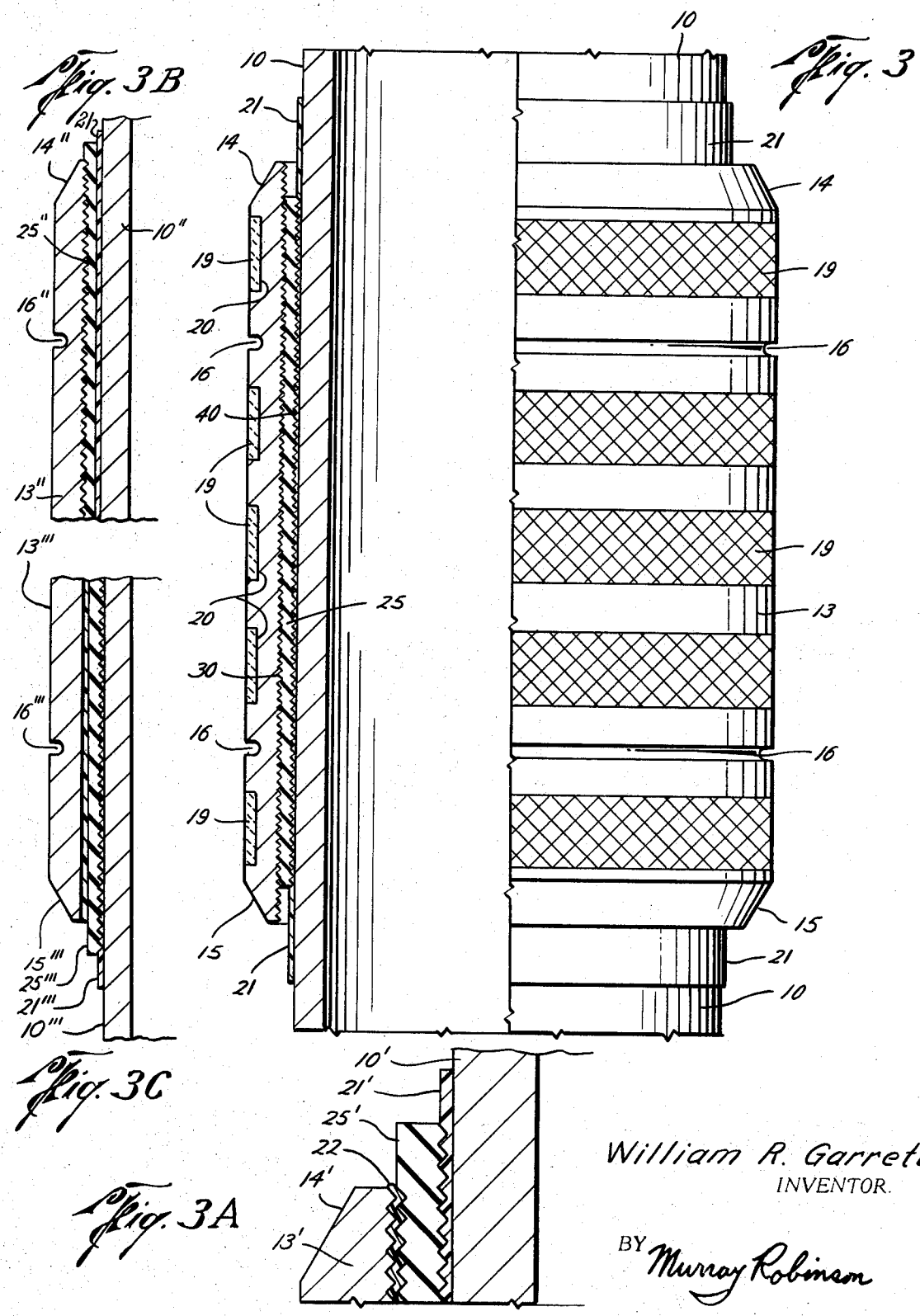

William R. Garrett
INVENTOR.

BY Murray Robinson
ATTORNEY

DRILL PIPE WEAR SLEEVE

BACKGROUND OF THE INVENTION

1. Field of the Invention

This invention relates to drill pipe used in the rotary system of drilling for petroleum, and to methods of making same, and more particularly to such drill pipe incorporating a plain or hard faced steel wear sleeve applied to the outer periphery of the drill pipe intermediate between the ends thereof to prevent wear on the drill pipe when used in open hole. In this regard a distinction should be made between such wear sleeves and so-called "drill pipe protectors" used in cased hole which actually are primarily for the purpose of protecting the casing against wear due to the drill pipe rotating therein and which are usually made of soft material, e.g., rubber sleeves resiliently engaging the outer periphery of the drill pipe.

2. Description of the Prior Art

The tool joints at the ends of a drill pipe are of larger diameter than the pipe and therefore largely prevent adjacent sections of the drill pipe from contacting the wall of a well bore. However, drill pipe usually comes in 20 to 40, usually 30 foot lengths which allows enough bend in the pipe or in the well bore between adjacent tool joints to let the pipe rub on the well wall. It is to protect the pipe against wear in the middle of the length of the pipe between the tool joints that open hole wear sleeves are provided.

To protect the middle of the pipe, the wear sleeve must be at or adjacent the middle of the pipe. It is therefore necessary that a wear sleeve be secured to the pipe sufficiently to prevent its moving axially along the pipe. At the same time, the manner of securing the sleeve to the pipe must be such as not to weaken or unduly stress the pipe.

The presence of the sleeve must not cause stress concentration in the pipe when the pipe is loaded. The prior art discloses that wear sleeves may be formed integrally (as one piece) with extra thick walled drill pipe if the sleeve thickness is not too great, e.g., of the order of 50 percent of the pipe thickness, but such construction is inapplicable to ordinary drill pipe and thick wear sleeves where the sleeve would be of the order of 200 percent of the drill pipe thickness. In the latter case the sudden change of thickness would cause stress concentration in the pipe adjacent the sleeve ends where the pipe flexes.

The presence of tool joints at the ends of the pipe and the variations in outer diameter of the pipe as supplied by the pipe mill are factors which affect the choice of attachment means. According to the prior art the sleeve may be split longitudinally to allow it to be placed around the pipe rather than the pipe threaded through the sleeve.

Prior to the present invention no satisfactory method of applying a wear sleeve to a drill pipe has been developed. The prior art sleeves fail either in insufficient attachment to retain the sleeve on the drill pipe or to prevent the sleeve from moving axially on the pipe or else weaken the pipe or cause excessive stress in the pipe either initially or when loaded. In addition, accumulation of well fluid around the drill pipe adjacent the wear sleeve attachment causes the drill pipe to corrode. It is the object of the present invention to overcome all of these problems.

The application of plain and hard faced sleeves to pipes of various types for various purposes is exemplified by by the following United States patents:

(a) Wear Sleeves for Drill Pipe
    2259023 —Clark (welded segments around stressed rubber)
    2295873 —Stone (welded segments around bonded rubber)
    2877062 —Hall et al. (welded cups around spring strips)
    3360846 —Schellstede et al. (shrink fitted segments)
    3499210 —Schellstede et al. (shrink fitted split sleeve)

(b) Tool Joint Wear Elements
    2281632 —Steps (welded segments)
    2293997 —Neuhaus (welded strip)
    2334350 —Neuhaus (welded ring)
    2592854 —Boice (spring ring)

(c) Non-Rotating Sleeves
    2318878 —Miller (drill pipe protector housing)
    2855052 —Wright (casing collar)
    3103391 —Leathers (stabilizer)

The prior art, as exemplified by the above listed patents, shows that it is known to apply hard facing to rings to be welded to tool joints, thereby to reduce wear of such joints. Due to the thickness of tool joints, welding a ring to the joint does not weaken the joint materially. In addition, it is recognized in the prior art that welding a wear sleeve directly to a drill pipe, which has a much thinner wall than a tool joint, would materially weaken the pipe.

The prior art also discloses that attempts have been made to apply wear sleeves to the middle of a drill pipe by means of what may be called the rubber sandwich technique. According to the latter construction, a metal sleeve of larger diameter than the outer diameter of the pipe is applied around the pipe with resilient means interposed between the pipe and sleeve, thereby to prevent stress concentration in the pipe at the ends of the sleeve when the pipe flexes under the load. As evidenced by lack of commercial acceptance, this technique has not heretofore been successful. This is believed to be due to insufficient attachment of the wear sleeve to the insert, causing the sleeve to come loose, or due to insufficient attachment of the insert to the drill pipe to prevent axial movement of the sleeve on the pipe so that the sleeve slips up to the nearest tool joint leaving the middle of the drill pipe unguarded.

The more recent Schellstede et al., patent represents an attempt to secure a metal wear collar directly to drill pipe, similar to the successful practice applied to tool joints, without damaging the pipe, as is the case with welding. The sleeve is attached by a shrink fit. There is no metal weakening due to welding directly to the drill pipe. However, since the sleeve is in direct contact with the pipes rather than spaced therefrom by a layer of rubber, there remains the problem of undue stress in the pipe at the ends of the sleeve when the pipe flexes under load. Also, if the shrink fit is not perfectly made, the sleeve can slide along the pipe. In addition, the initial stressing of the pipe due to the shrink fit increases the stress concentration in the pipe at the ends of the sleeve when the pipe is flexed.

The problem of corrosion adjacent a drill pipe wear sleeve does not seem to have been recognized in the prior art.

SUMMARY OF THE INVENTION

The present invention is an improvement on the aforementioned rubber (elastomer) sandwich technique of attachment of a metal wear sleeve to a drill pipe with a rubber insert between the sleeve and pipe.

According to one feature of the invention, in addition to bonding the elastomer insert to the pipe by cement and vulcanization and compressing the elastomer insert against the outer surface of the drill pipe, a mechanical interlock is provided between the inner surface of the elastomer insert and the cement at the outer surface of the pipe. This is effected by providing the inner surface of the elastomer insert with serrations transverse to the pipe axis. Since the cement then fills the grooves between the serrations, the cement and elastomer insert are mechanically interlocked.

According to another feature of the invention, in addition to the compression between the elastomer insert and the metal sleeve, achieved by tightening a clamp around the wear sleeve segments and insert prior to welding the segments together, and the further compression due to shrinkage of the welds when the sleeve segments are welded together, a mechanical interlock is provided between the inside of the metal sleeve and the outside of the elastomer insert. This is achieved by threading or in other manner grooving the interior of the metal sleeve transverse to the pipe axis. When the sleeve is compressed against the elastomer insert, the latter flows into the grooves in the sleeve forming a mechanical interlock.

As the result of the mechanical interlocking of the sleeve to the insert and of the insert to the cement, sufficient resistance to axial loading is achieved to provide a wear sleeve that stays put and successfully performs its function of guarding the middle of the drill pipe against wear caused by rubbing against the wall of the well bore without causing excessive stress in the pipe when it flexes.

Of the two mechanical interlocks, both are equally important. Absent the interlock between the insert and pipe, the insert slides on the pipe; absent the interlock between the sleeve and insert, the sleeve pulls free from the insert.

According to a further feature of the invention, the cement used to bond the insert to the drill pipe is continued beyond the ends of the insert and wear sleeve sufficiently to protect the drill pipe against corrision by well fluid trapped or accumulated adjacent the wear sleeve.

Other features of the invention, such as the thickness of the insert, the elastic modulus and percent elongation of the elastomer used for the insert, and the materials used for the insert and the cement, and the shape and construction of the sleeve segments and the manner of assembling, clamping and welding same, will become apparent from the following detailed description of the invention, reference being made to the accompanying drawings.

BRIEF DESCRIPTION OF THE DRAWINGS:

FIG. 1 is an elevation of a length of drill pipe to which has been applied a wear sleeve in accordance with one preferred embodiment of the invention;

FIG. 2 is a fragmentary horizontal section taken at plane 2—2 of FIG. 1 and showing also the clamp and water bath used in accordance with the method of the invention;

FIG. 3 is a vertical half section taken at plane 3—3 of FIG. 2;

FIGS. 3A, 3B, 3C, and 3D are fragmentary sections similar to FIG. 3, showing modifications;

FIG. 4 is an enlarged fragmentary vertical section through the wear sleeve showing the profile of the thread groove;

FIG. 5 is an enlarged fragmentary vertical section through the elastomer insert showing the profile of the grooves on the inner periphery thereof;

FIG. 11 is a perspective view, partly in section, showing a step in the method of the invention; and FIG. 12 is an enlarged fragmentary vertical section through the pipe and insert showing a modification.

Figure 6:
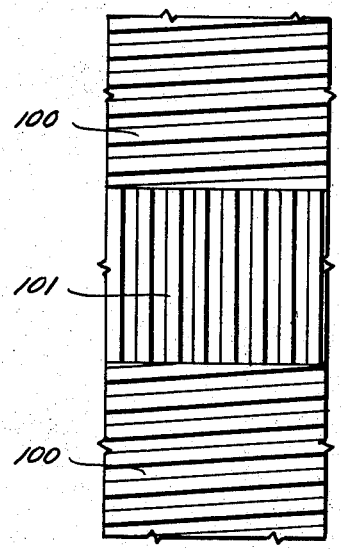
FIGS. 6,7,8,9A,9B,10A, and 10B are semi-schematic fragmentary details eillustrating various forms of mechanical interlock means useful in various modifications of the invention.

DESCRIPTION OF PREFERRED EMBODIMENTS:

Referring now to FIG. 1 there is shown a length of drill pipe 10 having a conventional tool joint box 11 at its upper end and a conventional tool joint pin 12 at its lower end, the box and pin being flash welded to the drill pipe to become unitized therewith. Intermediate between the ends of the drill pipe and spaced from the tool joints is attached a steel wear sleeve 13.

DRILL PIPE

Although the invention is applicable to drill pipe made of light metal such as aluminum alloys, typically the drill pipe will be made of steel. In any event the drill pipe will be made of metal having a tensile and compressive strength of at least 20,000 lb./sq.in. and an elastic modulus of at least 10,000,000 lbs. per square inch. Such material may be termed strong metal, to distinquish it from such materials as unalloyed lead, coper, and non metallic materials such as plastics. Typically drill pipe has a wall thickness of between one-eighth and one-half inch and thick walled drill pipe may be as thick as three-fourths inch or even up to a full inch.

WEAR SLEEVE

The wear sleeve 13 is also made of strong metal. The sleeve may have a thickness of the order of one-half inch, e.g., one-fourth to 1 inch, the the outer diameter preferably being of the order of tool joint diameter, e.g. 1 inch greater than that of a pipe of 4½ inch outer diameter. The sleeve is preferably beveled at its ends 14, 15, to prevent hang up of the wear sleeve on projections from the wall of the well bore. One or more annular grooves 16 are provided in the wear sleeve, said grooves providing increased flexibility to the sleeve. Preferably at least one such groove is provided near each end of the wear sleeve. Increased flexibility of the sleeve reduces stress concentration on the drill pipe when the latter bends inside the wear sleeve. For a wear sleeve of one-half inch thickness a suitable width for the flexure grooves is one-eighth inch with a depth of three-sixteenths inches. The flexure grooves also serve as a wear indicator.

The sleeve may be provided with a plurality of annular bands 19 of hard facing, such as sintered tungsten carbide, welded into annular grooves 20 (see FIG. 3). If desired the hard facing can be omitted as shown in FIGS. 3B and 3C, wherein like parts are numbered the same as in FIG. 3 except double primed and triple primed. As shown in FIGS. 3B and 3C the outer periphery of the wear sleeves 13″ and 13‴ is cylindrical and smooth except for the grooves 16″ and 16‴. The grooves can also be omitted if it is desired to increase the amount of metal in the sleeve and if the construction of the sleeve and insert otherwise compensates for the increased rigidity of the sleeve. The choice of whether or not to use bands of hard facing on the wear sleeve is similar to the choice of whether or not hard facing is applied to the tool joints and dependds upon whether the user is more concerned about wear on the drill pipe or wear on the casing in which the drill pipe rotates.

CEMENT

Extending out beyond the ends of the wear sleeve there is an annular layer 21 of a suitable cement. This protects the drill pipe against corrosion by well fluids accumulated around the drill pipe and held there by the wear sleeve and its attachment means.

INSERT

Referring now to FIGS. 2 and 3, it is seen that there is a tubular elastomeric insert 25 interposed between the metal drill pipe 10 and the metal wear sleeve 13. The insert 25 is preferably an elastomer, but other low elastic modulus materials can be used if they have sufficient strength. An elastic modulus less than 10 percent of that of the drill pipe steel is preferred in order to prevent stress concentrations in the drill pipe at the ends of the wear sleeve as might otherwise occur. Assuming an elastic modulus for steel of 30,000,000 lb. per sq. inch, the insert material should have a modulus of 3,000,000 lb/sq inch or less. For alloy aluminum pipe having an elastic modulus of 12,000,000 lb/sq. inch the insert should have a modulus of 1,200,000 lb/sq. inch or less. Other properties that the insert material must have are strength, resistance to fatigue, elasticity, resistance to permanent set under sustained compressive loading, stability in well fluids, and retention of the foregoing desired properties at elevated temperatures encountered in earth bores.

As previously noted, the insert is preferably an elastomer, e.g., a rubberlike material having an elongation of at least 50 percent prior to failure, and usually an elongation of several hundred percent prior to failure. However certain features of the invention are applicable to inserts made of materials having less maximum elongation, but preferably at least being flexible by which is meant ability of a 12 inch square sheet of one sixty-fourth inch thickness to bend double under manual pressure and without failure after 100 flexures, as will a sheet of paper.

The thickness of the insert is related to its elastic modulus. The insert should have enough thickness to prevent the wear sleeve from contacting the side of the drill pipe under expected load conditions. In this regard it is to be noted that in the embodiment of FIG. 1—3 the ends of the metal sleeve 13 extend slightly beyond the ends of the insert 25 to protect the latter from tearing by contact with the well wall or other protuberances. However, as shown in FIGS. 3A, 3B and 3D, wherein the parts are numbered the same as in FIG. 3 except primed, double primed, and quadruple primed, the insert may extend beyond the ends of the sleeve, the cement 21′, 21″, however, preferably extending beyond the ends of the rubber insert to prevent corrosion should any well fluid collect on the pipe adjacent the ends of the insert.

MECHANICAL INTERLOCK

The thickness of insert 25 is typically about one-eighth inch and preferably is between 0.05 and 0.25 inches, the lower end of the range being set in part by the thickness of the mechanical interlock means at the inner periphery of the insert and the inner periphery of the sleeve, the latter indenting the insert. The upper end of the range is determined in part by the availability of space, it being desired that most of the space be used up by the metal wear sleeve so as to lengthen the life of the sleeve and to provide sufficient thickness for welding together the sleeve, which is formed in segments as hereinafter described.

A suitable material for insert 25 is natural or synthetic rubber having a durometer hardness of between 20 and 99. An elastomer that has been found especially suitable is known to the trade as EPDM, referring to ethylene propylene diene modified polymer, e.g., as supplied under the tradename of NORDEL by DuPont, and Epsyn by Copolymer Rubber & Checmical Corporation, such polymer being suitably compounded and preferably having a peroxide cure. Technical data sheets for Nordel and Epsyn are appended hereto.

Referring now to FIGS. 4 and 5 as well as FIG. 3, mechanical interlock means is provided at the inner periphery of the metal sleeve 13 in the form of a screw thread 30. Suitable thread form and dimensions are indicated in FIG. 4. Mechanical interlock means is also provided at the inner periphery of the elastomer insert 25 in the form of a series of annular serrations 40. Suitable serration form and dimensions are shown in FIG. 5.

Since the prior art sleeves and inserts have been unsuccessful, it is necessary to draw a line of demarcation between natural roughness and the mechanical interlock means of the invention. Since the prior art also shows that the wear sleeve inner periphery can depart from a smooth cylindrical shape by having shoulders at its ends, but such gross shaping also proved unsuccessful, it is also necessary to draw a line of demarcation between such gross shaping and the mechanical interlock means of the present invention. It is believed that the radial extent of the mechanical interlock means, be it a roughened surface, threaded surface, serrated surface, or shaped surface, preferably should lie in the range of 0.010 to 0.250 and the frequency of the surface interruptions forming the mechanical interlock means preferably should be between 4 and 100 per inch.

Regardless of the particular form of the mechanical interlock means if it has a definite lay same preferably should have its major component transverse to the drill pipe axis in order to perform its function of preventing slippage of the insert on the pipe and preventing the sleeve from pulling loose from the insert under axial loading.

The mechanical interlock means preferably should extend over an area of at least about 50 square inches, or about 4 inches axially and 360° circumferentially for a 4½ inch outer diameter drill pipe. In this regard it should be noted that with an elastomer or other low elastic modulus insert material, the stress on the insert due to a push or pull at an end of the strong metal wear sleeve will be distributed over a considerable length of the insert, whereby up to a point the resistance of the sleeve to slippage can be increased as desired by lengthening the sleeve and insert. This is in contrast with a joint between two strong metal members, such as a threaded connection, where most of an axial load is concentrated in one or two thread turns at each end of the connection.

Preferably the mechanical interlock means has such a profile that the area of the radial projection of its surface at the mean radius thereof divided by the area of the axial projection of its surface is greater than the coefficient of static friction between the insert and the sleeve or cement as the case may be, so that increase in the axial load on the sleeve will increase the force required to cause the insert surface to slip relative to the cement or sleeve by an amount at least as great as the increase in force component parallel to the detailed surface of the interlock. This is particularly important in the case of the unbonded interlock between the wear sleeve and insert for if the force tending to cause surface slippage between the elastomer insert and sleeve is exceeded the elastomer can flow from crest to valley to allow the sleeve to slip off. It should be added however that, as shown in FIG. 3A, it is within the scope of the invention to bond the surface between the wear sleeve and insert with a suitable cement 22 in addition to the provision of mechanical interlock means therebetween.

In one aspect the mechanical interlock means can be viewed as a means for increasing the area of contact between the insert and the wear sleeve and cement, thus reducing the shear stress over the area of contact.

This aspect of the mechanical interlock means is effective not only to increase the resistance to axial loads. If the mechanical interlock means is of one of the types herein described in connection with the preferred embodiment and modification where the lay of the interlock means is substantially perpendicular to the drill pipe axis, the aspect of the mechanical interlock means wherein it functions as means to increase the contact area is particularly important in providing increased resistance to torsional loading, for the lay of the interlock means is irrelevant as far as increase in area of contact is concerned.

Figure 7:
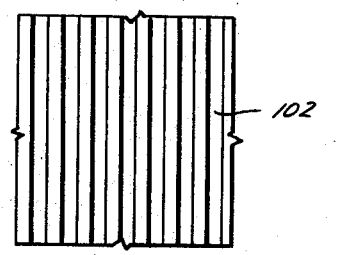
Figure 8:
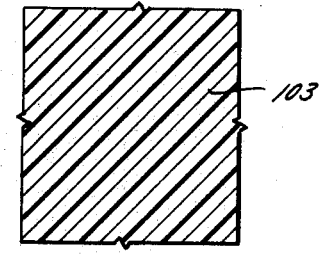
Figure 9A:
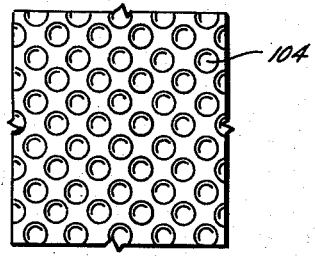
Figure 9B:
Figure 10A:
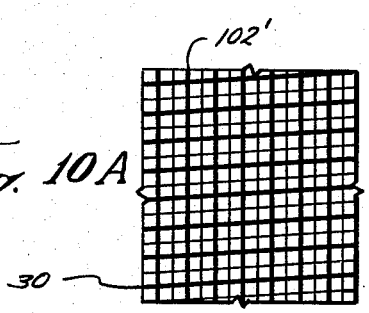
Figure 10B:
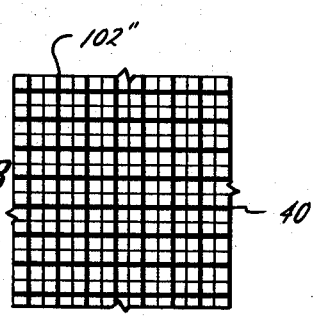

From the foregoing it will be apparent that the mechanical interlock means serves to increase the resistance to slipping not only axially but also torsionally, but if the lay is largely transverse to the pipe axis, the greatest increase is relative to axial loading. If desired, the lay of the mechanical interlock means need not all be the same, e.g., as shown in FIG. 6, one portion may have grooves 100 directed transverse to the pipe axis to increase primarily the resistance to axial loading whereas another portion may have groove 101 directed axially to increase primarily the resistance to torsional loading, as shown in FIG. 6. A suitable mechanical interlock means to resist primarily torsional loading would be a fluted surface having a profile similar to that of the threaded or serrated surfaces shown in FIGS. 4 and 5. If the load conditions in drilling are such that the expected torsional loading exceeds the expected axial loading, which would be unusual, then the mechanical interlock means could have a lay directed primarily axially, or, as shown in FIG. 7, flutes 102 directed wholly axially. A mechanical interlock means having a lay directed at such an angle to the pipe axis as to have substantial components both axially and transverse to the pipe axis, e.g., a thread 103 as shown in FIG. 4 but having a larger helex angle, e.g., 45° as shown in FIG. 8, is within the scope of the invention, as is also a mechanical interlock means having no lay at all, such as the dimpled surface shown in FIGS. 9A, 9B, (dimples 104). However the preferred interlock means is that shown in FIGS. 4 and 5. If desired to increase the torsional resistance of the mechanical interlock shown in FIGS. 4 and 5, axial grooving could be added thereto producing flutes 102' and 102'', as shown in FIGS. 10A, 10B.

METHOD OF MANUFACTURE

Referring once again to FIG. 2, the wear sleeve 13 is initially fabricated in two semi-cylindrical sections X and Y which are welded together at their longitudinal edges 51, 52, the weld beads being shown at 53, 54. The two sections X and Y may be made by sawing in half an initially integral (one-piece) cylindrical tube. Prior to sawing the tube in half it may be provided with longitudinal grooves at the areas of the saw cuts, thus leaving grooves 60, 61 in the longitudinal edges of the two sections at the outer peripheries thereof. When the two sleeve sections are assembled the two pairs of adjacent grooves 61—61 provide weld grooves adapted to receive the metal of the welds 53, 54 when the sections are assembled around the insert on the pipe.

Prior to assembling the sleeve sections around the pipe, it is necessary to install the elastomer insert in position. The insert may initially be flat and composed of one or more pieces which are wrapped around the pipe, or it can be initially formed as a tube and slit to permit it to be placed around the pipe, or it can be cut into a number of pieces and put in place. Preferably it is initially a tube and is cut into two semi-cylindrical sections.

It is important that a strong adhesive be used between the insert and the pipe and that the pipe surface be clean before the adhesive is applied to the pipe. The pipe can be cleaned by sand blasting. A suitable adhesive is an epoxy cement having a high temperature stability. One such cement is available from the Devcon Corporation, Danvers, Massachusetts, under the tradename Devcon C.

Generally, the cement will be a polymer such as a synthetic resin having sufficient shear strength that the serrations molded therein, e.g., by contact with the serrations of the insert, will provide a true mechanical interlock. A suitable epoxy polymer is made by the condensation of ethylene oxide and diphenol. The cement should have sufficient toughness that the serrations molded thereon will not break off under usual maximum shock loads expected during drilling.

A preferred method for assembling and attaching the wear sleeve and insert to the drill pipe is as follows:

1. Sand blast pipe over area of attachment and for a distance therebeyond towards both ends of the drill pipe.
2. Heat EPDM elastomer insert sections and Devcon C resin to 200° F.
3. Mix hardener into resin and apply resulting cement over sand blasted area of pipe and to grooved side of insert sections in amount just sufficient to fill the grooves.
4. Put insert sections into two segments of sheet metal, wrap around clamp 110 as shown in FIG. 11.
5. Put clamp around pipe and tighten sufficiently to bring insert into full contact with the pipe. This means only that all peaks of the serrations are in contact with the pipe, not that the serrations are flattened out.
6. Place section of the drill pipe carrying the insert and clamp into an oven and perform the cure cycle recommended for the cement. For Devcon C this is 250° F. for 3 hours followed by 350° F. for 6 hours.
7. Remove pipe from oven, remove clamp, remove any excess epoxy from the grooves between the two sections of the insert.
8. Place steel wear pad sections around insert.
9. Peen each section of the steel wear pad until its longitudinal edges bite slightly into the insert.
10. Install preload clamp halves 120–121 around wear sleeve section as shown in FIG. 2 and tighten nuts 122 on through bolts 123. The longitudinal edges 51,52 of the wear sleeve are not in contact prior to tightening the clamp, but the clamp should be tightened until the slight clearance therebetween, e.g., one-sixteenth inch, is substantially closed, so that weld metal will not contact the insert.
11. Place drill pipe portion carrying wear sleeve into water with pipe axis horizontal and uppermost weld groove just above water level (indicated at 125 in FIG. 2)
12. Tack weld the upper-most (above water) weld groove, rotate pipe until other weld groove is similarly just above water, and tack weld the latter weld groove.
13. Remove clamp.
14. Alternately weld the grooves one pass at a time until grooves are filled and overflush.
15. Grind welds flush.

The initial stress on the insert due to the clamping is preserved by the welds and may even be increased due to shrinkage of the welds on cooling, to the extent permitted by abutment of the longitudinal edges of the two sections of the wear sleeve.

It may be added that the flexure grooves and the grooves that receive the hard facing may be formed in the wear sleeve either before it is cut in sections or after it is welded together in place around the pipe. If they are formed before the sleeve is cut in sections, there will be interruptions in the grooves due to the weld beads joining the sections, there being as many interruptions as sections, i.e., at least two, and more if the sleeve is cut into more than two sections. These interruptions can be removed, if desired, e.g., by grinding or cutting. The hard facing can be applied to the grooves therefor at any time after the grooves are formed. The drill pipe is then ready for use.

MODIFICATIONS

FIG. 12 shows an alternative to serrating the inner periphery of the elastomer insert. The pipe 10 is first coated with epoxy or other suitable cement 250 and wrapped with wire 251 prior to curing. The wire is then removed to leave a thread 252 on the outer periphery of the epoxy coated pipe to provide the necessary mechanical interlock with an insert having a smooth inner periphery.

If a cement were used having sufficient adhesion between the metal of the pipe and the particular elastomer of the insert to prevent slippage or failure at the anticipated loading, the mechanical interlock between the elastomer insert and the drill pipe might be eliminated as shown in FIG. 3B.

On the other hand, there being no adhesive between the insert and the wear sleeve, a mechanical interlock at this point is believed to be essential. Viewed in another light, it could be said that the combination of prestress and mechanical interlock makes the use of adhesive between the wear sleeve and insert unnecessary. A prestress sufficient to cause the thread or other indenting means of the wear sleeve to fully embed itself in the insert is preferred to achieve this desired result.

However if a sufficiently strong adhesive were used between the wear sleeve and the insert to prevent slippage between the insert and wear sleeve, the mechanical interlock therebetween could be omitted, as shown in FIG. 3C whilestill using the mechanical interlock between the insert and drill pipe or the cement thereon. In this regard, one could regard the steel sleeve and the elastomer insert as a composite drill pipe guard sleeve secured to the drill pipe by a layer of cement, with a mechanical interlock between the guard sleeve and the cement layer.

Despite the possibility of using only one mechanical interlock, the use of two such mechanical interlocks is preferred.

While a preferred embodiment of the invention and modifications thereof have been shown and described, further modifications thereof can be made by one skilled in the art without departing from the spirit of the invention.

I claim:

1. Drill pipe made of strong metal and of elongated tubular configuration and having tool joints at the ends thereof, said drill pipe having intermediate the ends of the pipe between the tool joints a wear sleeve made of strong metal and having an inner diameter larger than the outer diameter of the portion of the pipe therewithin, a tubular insert of elastic material under compression between the sleeve and the drill pipe, said insert having an elastic modulus less than that of the metal of the pipe, said insert being held against axial movement relative to said pipe with cement, and mechanical interlock means distributed over axially extending area between the inner periphery of said sleeve and the outer periphery of said insert, said mechanical interlock means including indenting means on the inner periphery of the sleeve to indent the outer periphery of the insert, said insert having a less indented outer peripheral surface when in an unstressed state than when under compression and indented by said indenting means, the material of said insert being an elastomer and the outer periphery of said insert being smooth when unstressed, e.g., when said insert is relieved of the compression between said sleeve and said pipe, the inner periphery of the sleeve being unbonded to the outer periphery of the insert, said indenting means having a radial extent of 0.05 to 0.25 inches and a frequency of between four and 100 interruptions per inch in at least one direction and extending over at least 50 square inches, and mechanical interlock means between the surface at the inner periphery of said insert and the surface at the outer periphery of said cement, the last said mechanical interlock means including indenting means on at least one of said surfaces, the interface between said cement and said pipe being smooth compared to said surface including the last said indenting means, the last said indenting means having a radial extent of 0.05 to 0.25 inches and a frequency in at least one direction of between four and 100 interruptions per inch and extending over at least 50 square inches, and the said indenting means of the mechanical interlock means between said cement and said insert being preformed on the outer periphery of the cement to indent the inner periphery of the elastomeric insert, said insert having a less indented inner peripheral surface when in an unstressed state than when under compression and indented by said indenting means of said cement.

2. Drill pipe made of strong metal and of elongated tubular configuration and having tool joints at the ends thereof, said drill pipe having intermediate the ends of the pipe between the tool joints a wear sleeve made of strong metal and having an inner diameter larger than the outer diameter of the portion of the pipe therewithin, a tubular insert of elastic material between the sleeve and the drill pipe, said insert having an elastic modulus less than that of the metal pipe, said insert being held against axial movement relative to said pipe by cement therebetween, and mechanical interlock means between the surface at the inner periphery of said insert and the surface at the outer periphery of said cement, said mechanical interlock means including indenting means on at least one of said surfaces, the interface between said cement and said pipe being smooth compared to said surface including said indenting means, said indenting means having a radial extent of 0.05 to 0.25 inches and frequency in at least one direction of between four and 100 interruptions per inch and extending over at least 50 square inches, the material of the insert being an elastomer and said indenting means being preformed in said cement at the outer periphery thereof to indent the inner periphery of the elastomeric insert, said insert being under compression against said groove means, said insert having a less indented inner peripheral surface when in an unstressed state than when under compression between said sleeve and said cement.

3. Drill pipe made of strong metal and of elongated tubular configuration, said drill pipe having intermediate the ends of the pipe a wear sleeve made of strong metal and having an inner diameter larger than the outer diameter of the pipe, a tubular insert of elastomeric material around the drill pipe inside the sleeve, said insert having an elastic modulus of less than 10 percent of that of the metal of the pipe and a maximum elongation of at least 50 percent, indentations distributed over an axially extended area of the inner periphery of said elastomeric insert and distributed annularly about the insert axis, said indentations having a radial extent in the range of 0.05 to 0.25 inches and a frequency in at least one direction in the range of four to 400 interruptions per inch and extending over at least 50 square inches, tough elastic cement filling said indentations and in contact with and adhered to the outer periphery of said pipe, said cement and insert being under compression between said pipe and said wear sleeve, indenting means distributed over an axially extended area of the inner periphery of said wear sleeve and distributed annularly about the axis thereof, said indenting means having a radial extent in the range of 0.05 to 0.25 inches and a frequency in at least one direction in the range of four to 400 interruptions per inch and extending over at least 50 square inches, said indenting means functioning to form indentations in the outer periphery of said elastomeric insert by being pressed thereagainst, and stress formed indentations in the outer periphery of said insert which indentations do not exist absent the pressure of said indenting means against said outer periphery of the insert.

4. Drill pipe made of strong metal and of elongated tubular configuration, said drill pipe having intermediate the ends of the pipe a wear sleeve made of strong metal and having an inner diameter larger than the outer diameter of the pipe, a tubular insert of elastomeric material around the drill pipe inside the sleeve, said insert having an elastic modulus of less than ten percent of that of the metal of the pipe and a maximum elongation of at least 50 percent, cement means securing said elastomer insert to said pipe, said insert being under compression between said cement means and said metal sleeve, indentations distributed over an axially extended area of the interface between the inner periphery of said elastomeric insert and said cement means and distributed annularly about the insert axis, said indentations having a radial extent in the range of 0.05 to 0.25 inches and a frequency in at least one direction in the range of four to 400 interruptions per inch and extending over at least 50 square inches, said indentations being in both said cement and said insert and being correlative, indenting means distributed over an axially extended area of the inner periphery of said wear sleeve and distributed annularly about the axis thereof, said indenting means having a radial extent in the range of 0.05 to 0.25 inches and a frequency in at least one direction in the range of four to 400 interruptions per inch and extending over at least 50 square inches, said indenting means functioning to form indentations in the outer periphery of said elastomeric insert by being pressed thereagainst, and stress formed indentations in the outer periphery of said insert which indentations do not exist absent the pressure of said indenting means against said outer periphery of the insert.

5. Drill pipe made of strong metal and of elongated tubular configuration, said drill pipe having intermediate the ends of the pipe a wear sleeve made of strong metal and having an inner diameter larger than the outer diameter of the pipe, a tubular insert of elastomeric material around the drill pipe inside the sleeve, said insert having an elastic modulus of less than ten percent of that of the metal of the pipe and a maximum elongation of at least 50 percent, a layer of tough elastic polymer cement around the pipe inside said insert, mechanical interlock means distributed over axially extending area between the inner periphery of said sleeve and outer periphery of said insert comprising indenting means on the inner periphery of the sleeve to indent the outer periphery of the insert, and mechanical interlock means between the inner periphery of said insert and the outer periphery of said cement comprising interengaged indentations on the outer periphery of the cement and the inner periphery of the insert, said insert being under compression between said sleeve and cement sufficient to cause said indenting means to indent the surface of the insert adjacent to said indenting means beyond the degree of smoothness of said surface when said compression is relieved.

6. Drill pipe according to claim 5 wherein said sleeve extends axially beyond said insert at each end thereof to protect the insert, and said cement coats said pipe in the annulus between said sleeve and pipe beyond the ends of said insert.

7. Drill pipe according to claim 5 wherein said cement coats said pipe adjacent the ends of the sleeve beyond the ends of said sleeve out from inside the sleeve.

8. Drill pipe according to claim 5 wherein said insert extends axially beyond said sleeve at each end thereof to protect said pipe adjacent the ends of the sleeve against corrosion.

9. Drill pipe according to claim 8 wherein said cement coats said pipe adjacent the ends of said insert beyond the ends of said insert.

10. Drill pipe according to claim 5 wherein the lay of said mechanical interlock means is primarily transverse to the axis of said drill pipe.

11. Drill pipe according to claim 5 wherein said mechanical interlock means in part is of a lay primarily parallel to the axis of the drill pipe and in part of a lay primarily transverse to the axis of the drill pipe.

12. Drill pipe according to claim 5 wherein the lay of said mechanical interlock means is primarily parallel to the axis of said drill pipe.

13. Drill pipe according to claim 12 wherein said mechanical interlock means includes a fluted surface.

14. Drill pipe according to claim 5 wherein the lay of said mechanical interlock means has substantial components both parallel and transverse to the axis of said drill pipe.

15. Drill pipe according to claim 14 wherein said mechanical interlock means includes a dimpled surface.

16. Drill pipe according to claim 5 wherein the first said mechanical interlock means includes a threaded surface that is axially grooved and the second said mechanical interlock means includes a surface that is serrated annularly and grooved axially.

17. Drill pipe according to claim 5 wherein said sleeve includes flexure groove means in said outer periphery thereof to decrease the rigidity of the sleeve and thereby reduce stress concentration in the pipe when the pipe bends inside the sleeve.

18. Drill pipe according to claim 5 wherein each of said indenting means has a radial extent of 0.05 to 0.25 inches and a frequency in at least one direction each of between four and 100 interruptions per inch and extends over at least 50 square inches.

19. Drill pipe according to claim 5 wherein said cement is an epoxy cement that is stable at temperatures of up to 350° F. and said insert is bonded to said pipe with said cement.

20. Drill pipe according to claim 5 wherein the outer periphery of said insert is smooth when unstressed, e.g., when said insert is relieved of the compression between said sleeve and said pipe, and wherein the inner periphery of the sleeve is unbonded to the outer periphery of the insert.

21. Drill pipe according to claim 5 wherein the indenting means of the mechanical interlock means between said insert and said cement is preformed on the inner periphery of the elastomeric insert.

22. Drill pipe made of strong metal and of elongated tubular configuration, said drill pipe having intermediate the ends of the pipe a wear sleeve made of strong metal and having an inner diameter larger than the outer diameter of the pipe, a tubular insert of elastomeric material under compression between the sleeve and the drill pipe, said insert having an elastic modulus of less than ten percent of that of the metal of the pipe and a maximum elongation of at least 50 percent, said insert being held against axial movement relative to said pipe with cement, mechanical interlock means distributed over axially extending area between the inner periphery of said sleeve and outer periphery of said insert comprising indenting means on the inner periphery of the sleeve to indent the outer periphery of the insert, said insert having a less indented outer peripheral surface when in an unstressed state than when under compression and indented by said indenting means, mechanical interlock means between the surface at the inner periphery of said insert and the surface at the outer periphery of said cement, the last said mechanical interlock means including indenting means on at least one of said surfaces, the interface between said cement and said pipe being smooth compared to said surface including the last said indenting means, the indenting means of the mechanical interlock means between said cement and said insert being preformed on the outer periphery of the cement to indent the inner periphery of the elastomeric insert, said insert having a less indented inner peripheral surface when in an unstressed state than when under compression and indented by said indenting means of said cement.

23. Drill pipe made of strong metal and of elongated tubular configuration, said drill pipe having intermediate the ends of the pipe a wear sleeve made of strong metal and having an inner diameter larger than the outer diameter of the pipe, a tubular insert of elastomeric material around the drill pipe inside the sleeve, said insert having an elastic modulus of less than 10 percent of that of the metal of the pipe and a maximum elongation of at least 50 percent, a layer of tough elastic polymer cement around the pipe inside said insert, mechanical interlock means distributed over axially extending area between the inner periphery of said sleeve and outer periphery of said insert comprising indenting means on the inner periphery of the sleeve to indent the outer periphery of the insert, and mechanical interlock means between the inner periphery of said insert and the outer periphery of said cement comprising indenting means on the outer periphery of the cement to indent the inner periphery of the insert, said insert being under compression between said sleeve and cement sufficient to cause both of said indenting means to indent the surfaces of the insert adjacent to said indenting means beyond the degree of smoothness of said surfaces when said compression is relieved.

* * * * *

PO-1050
(5/69)

UNITED STATES PATENT OFFICE
CERTIFICATE OF CORRECTION

Patent No. 3,697,141     Dated October 10, 1972

Inventor(s) William R. Garrett

It is certified that error appears in the above-identified patent and that said Letters Patent are hereby corrected as shown below:

The designation of the assignee as "Smith Industries, International, Inc." is deleted, and the corporate name -- Smith International, Inc. -- is substituted in its place.

Signed and sealed this 11th day of June 1974.

(SEAL)
Attest:

EDWARD M. FLETCHER, JR.
Attesting Officer

C. MARSHALL DANN
Commissioner of Patents